US007115879B2

(12) United States Patent
Leach et al.

(10) Patent No.: US 7,115,879 B2
(45) Date of Patent: Oct. 3, 2006

(54) DOCUMENT AUTHENTICATING APPARATUS AND METHOD

(75) Inventors: Jeremy Russel Leach, Southampton (GB); Bryan James Christophersen, Hants (GB)

(73) Assignee: De la rue International Limited, Hampshire (GB)

( * ) Notice: Subject to any disclaimer, the term of this patent is extended or adjusted under 35 U.S.C. 154(b) by 21 days.

(21) Appl. No.: 10/181,184

(22) PCT Filed: Feb. 7, 2001

(86) PCT No.: PCT/GB01/00494

§ 371 (c)(1),
(2), (4) Date: Aug. 16, 2002

(87) PCT Pub. No.: WO01/59718

PCT Pub. Date: Aug. 16, 2001

(65) Prior Publication Data

US 2003/0107004 A1 Jun. 12, 2003

(30) Foreign Application Priority Data

Feb. 9, 2000 (GB) ................................ 0002977.7

(51) Int. Cl.
*G01N 21/23* (2006.01)

(52) U.S. Cl. ...................................................... 250/372

(58) Field of Classification Search ................ 250/372, 250/556, 461.1, 458.1, 459.1; 382/135, 137, 382/138, 139, 140, 282
See application file for complete search history.

(56) References Cited

U.S. PATENT DOCUMENTS

| | | | | |
|---|---|---|---|---|
| 5,456,498 | A * | 10/1995 | Greene | 283/70 |
| 5,966,456 | A * | 10/1999 | Jones et al. | 382/135 |
| 6,305,818 | B1 * | 10/2001 | Lebens et al. | 362/184 |
| 6,363,164 | B1 * | 3/2002 | Jones et al. | 382/135 |
| 6,603,126 | B1 * | 8/2003 | Yamada et al. | 250/372 |
| 6,665,431 | B1 * | 12/2003 | Jones et al. | 382/135 |
| 6,741,336 | B1 * | 5/2004 | Ahlers et al. | 356/71 |

FOREIGN PATENT DOCUMENTS

| | | |
|---|---|---|
| EP | 0 720 133 A2 | 7/1996 |
| EP | 0 805 408 A2 | 11/1997 |
| EP | 0 807 904 A2 | 11/1997 |
| JP | 04043486 | 2/1992 |
| WO | WO 93/07591 | 4/1993 |

* cited by examiner

*Primary Examiner*—Otilia Gabor
(74) *Attorney, Agent, or Firm*—Oliff & Berridge, PLC

(57) ABSTRACT

A document (e.g. banknote) authenticating apparatus comprises a transport system (32–34, 50, 51) for transporting banknotes. An inspection device (35) is provided past which banknotes are transported by the transport system, the inspection device including a UV source (1) such as a LED and a UV detector (4, 5) arranged to irradiate a banknote and to detect reflected UV respectively. A processor (11) is responsible to the reflected UV to determine the authenticity of the banknote. The inspection device (35) includes a reference surface (3) over which the banknotes are transported in use, the reference surface being exposed to UV radiation from the source (1) in the absence of a banknote so as to generate a reference level signal, and being oriented such that the banknotes are delivered at an acute angle to the surface whereby passage of a banknote across the surface effects a cleaning action on the surface.

5 Claims, 5 Drawing Sheets

DOCUMENT AUTHENTICATING APPARATUS AND METHOD

The invention relates to a method and apparatus for authenticating documents of value such as banknotes.

It is well known that the response of banknotes to ultraviolet irradiation can be used to authenticate the banknotes as genuine. This may involve monitoring the amount of UV radiation reflected by the banknote and/or the amount of fluorescent light emitted by the banknote in response to UV radiation. Examples of known techniques are described in U.S. Pat. No. 4,296,326, EP-A-0679279 and EP-A-0807904.

It is important to be able to calibrate the UV source at regular intervals and a conventional approach to this is described in EP-A-0807904 in which a piece of white fluorescent paper is fed through the system. It is also known to provide a surface of known colour opposite to the radiation source as part of the banknote guide system. However, in the latter case, dirt can build up on the reference surface during use to an extent that it no longer provides a reliable reference surface.

WO-A-95/19019 discloses a method of detecting counterfeit banknotes by detecting ultraviolet light at a sample from a source and measuring the level of ultraviolet light reflected from the sample using a first photocell and the amount of fluorescent light generated by the sample using a second photocell. The detected levels are compared with reference levels and only if both reflective and fluorescent criteria are satisfied is the note declared genuine. The sample, during test, is swiped over a glass window, preferably under an overlying shield.

In accordance with a first aspect of the present invention, an authenticating apparatus for documents of value comprises a transport system for transporting the document; an inspection device past which the documents are transported by the transport system, the inspection device including a UV source and a UV detector arranged to irradiate a document and to detect reflected UV respectively; and a processor responsive to the reflected UV to determine the authenticity of the document, the inspection device including a reference surface over which the documents are transported in use, the reference surface being exposed to UV radiation from the source in the absence of a document so as to generate a reference level signal, and being oriented such that the documents are delivered at an acute angle to the surface whereby passage of a document across the surface effects a cleaning action on the surface.

We have devised a modified arrangement in which the passage of documents can be used to clean the reference surface thus extending its lifetime before manual cleaning must be carried out.

Typically, the reference surface will be white.

Conveniently, the apparatus includes a second detector for detecting fluorescent light emitted by the document in response to UV irradiation, the processor being responsive to output signals from both detectors to determine the authenticity of a document.

Thus, in the first example where only a reflected UV detector is provided, authenticity will typically be confirmed if the amount of reflected UV exceeds a threshold or lies within a predetermined range. Where a fluorescence detector is also provided then an additional test can be made, the document being confirmed as genuine only if the level of fluorescence falls below a predetermined threshold.

Where two detectors are provided, it is convenient to utilize the same calibration parameters determined for the UV reflector detector also for the UV fluorescence detector. It has been found in practice that commercial detectors operating in the respective wavebands for reflected and fluorescent radiation have similar performances and so the same gain factors can be applied to each. This is particularly the case with the use of UV light emitting diodes (LEDs).

Conventional authentication apparatus has utilized UV lamps to generate UV radiation. However, these lamps generate a relatively wide range of wavelengths and can include regions where the UV reflectance of a counterfeit document exceeds that of a genuine document. It is possible to restrict the output spectrum of the fluorescent lamp by using additional filters, but these add extra cost, and will inevitably absorb some of the illumination in the useful region, so necessitating extra output power from the lamp. They will also increase the size and cost of the detection system.

In accordance with a second aspect of the present invention, a method of authenticating documents of value, the method comprises irradiating the documents with UV radiation using a LED which emits UV radiation in a wavelength range at which non-genuine documents have a different reflectivity than genuine documents; detecting the reflected UV; and comparing the intensity of the reflected UV radiation with a threshold to determine the authenticity of the documents.

In accordance with a third aspect of the present invention, an authenticating apparatus for documents of value comprises a LED which emits UV radiation in a wavelength range at which non-genuine documents have a different reflectivity than genuine documents; a transport system for transporting documents past the LED so that they are irradiated with UV radiation; a detector for detecting the reflected UV; and a processor for comparing the intensity of the reflected UV radiation with a threshold to determine the authenticity of the documents.

We have found that a UV LED generates UV radiation with a much more focussed output spectrum making it much easier to distinguish between genuine and counterfeit documents. Typically, non-genuine documents have a lower reflectivity than genuine documents but the opposite is also true in some cases.

The use of UV LEDs has a number of further advantages:

1. Size: UV LEDs are available in packages significantly smaller than fluorescent lamps, allowing designs that are more compact.
2. Voltage Requirements: Fluorescent lamps require voltages between 24V and several hundred volts for their operation; UV LEDs require about 4 volts, making their use more compatible with modern electronic equipment, which commonly uses a 5V supply.
3. Optical Efficiency: The output of fluorescent lamp is radiated omnidirectionally from the phosphor, which is normally coated on the inside of the glass bulb or tube. This makes it very difficult to direct the output efficiently onto the note being measured, unless large optics are used. A UV LED mounted in a conventional package produces a relatively well contained beam along a relatively well defined axis: this allows efficient illumination without complicated optics.
4. Power Requirements: For equal illumination intensities, the power required for the UV LED is less than that required for fluorescent lamps, so allowing the use of smaller, cheaper power supplies, or batteries.
5. Speed: In some implementations, it is advantageous to modulate the UV illumination. The decay time of the phosphor limits the frequency at which the output of a fluorescent lamp can be modulated. The decay time varies from unit to unit, but efficient modulation above a few kilohertz is usually difficult with easily available designs. UV LEDs can be modulated at much faster frequencies (at least many tens of kilohertz), allowing their use in a wider range of implementations.

6. Robustness: Fluorescent lamps are usually made of relatively thin glass, which is liable to break if subjected to shock: some types also have heaters that are relatively thin wires—these are also fragile and liable to breaking. UV LEDs, in common with most modern semiconductor devices, are much more robust, and so suited for a much wider range of applications.

The invention is applicable to all documents of value which exhibit suitable UV characteristics including cheques, postal orders etc but especially banknotes.

In some cases, in the case of banknotes, a fixed reflectance intensity threshold can be used for all banknotes but for certain currencies, the method further comprises selecting the threshold in accordance with the denomination and/or issue of the banknote. This could be supplied manually by the operator but conveniently the method further comprises determining the denomination of a banknote and selecting the threshold in accordance with the determined denomination. Banknote denomination can be determined in a variety of conventional ways using size detectors where denominations in a currency vary with size or pattern recognition which is particularly suitable for US currency.

Conveniently, the method further comprises determining the level of reflected UV when no document is present so as to define a reference level, the threshold being defined with respect to the reference level. Thus, the or each threshold may be defined as an offset value which is added to the currently determined reference level.

The reference level could be determined by feeding a sheet of known characteristics past the LED and detector preferably determined by detecting UV reflected from a reference surface. In that connection, apparatus according to the first aspect of the present invention is particularly suitable.

Some examples of methods and apparatus according to the invention will now be described with reference to the accompanying drawings, in which.

Figure 1:
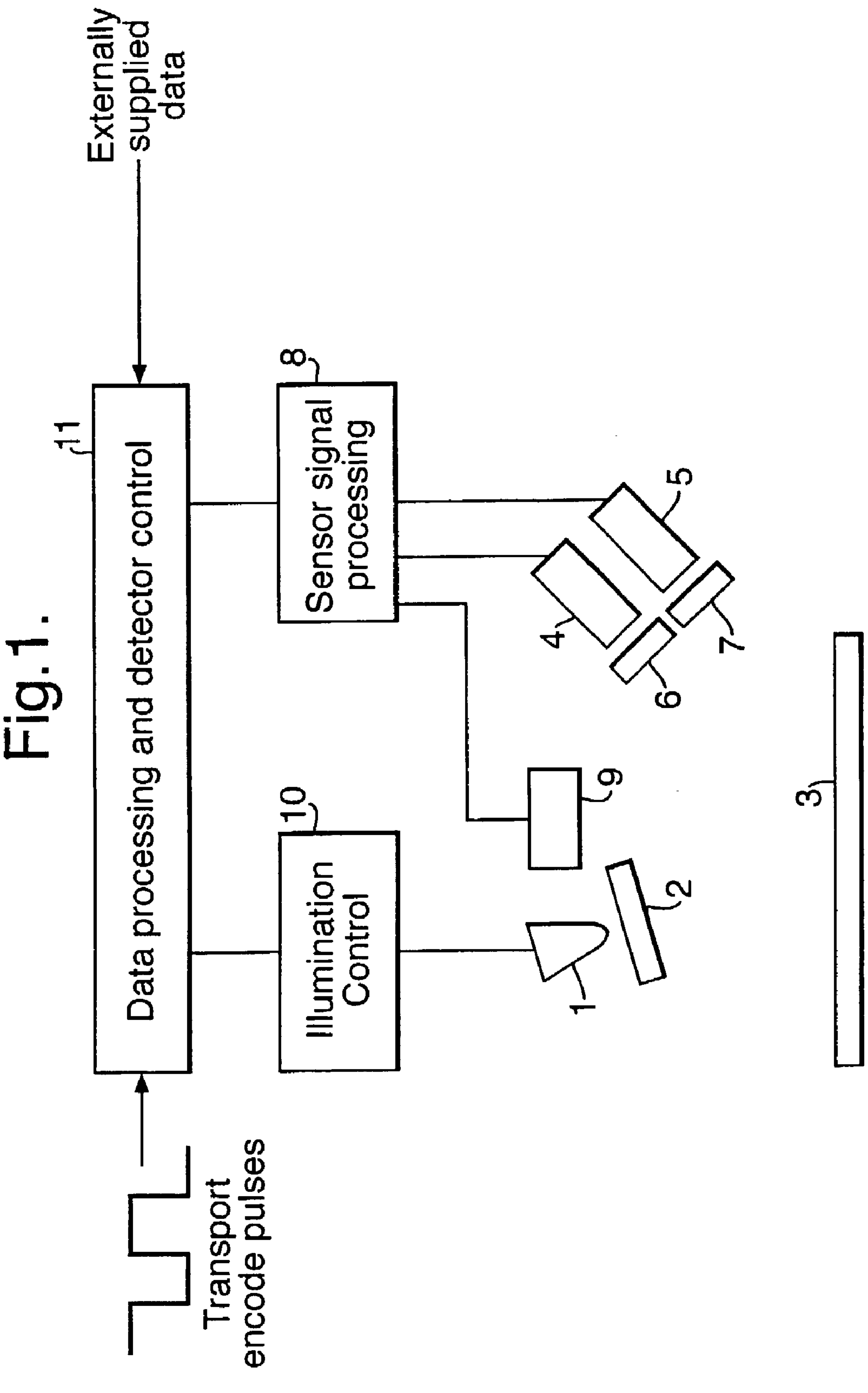
FIG. 1 is a block diagram of the primary components of the authentication apparatus.

FIG. 1 illustrates the primary components of the authentication apparatus. These includes an illumination source 1 for generating UV radiation. This may be a UV lamp or, preferably, a UV LED or set of UV LEDs. In the case of a lamp, a filter 2 is provided to limit the wavelength range of the radiation which is transmitted although this is not always required in the case of a UV LED. In the present example, the UV-LED outputs a small proportion of its light in the visible spectrum. This can be seen as a dull-yellow glow from the UV-led. This visible light needs to be blocked with a filter, in one example a Hoya U360 filter, to prevent it interfering with the UV-fluorescence detector. This filter would not be necessary if the detector only examined the UV-reflectance properties of the banknote in question. Because the detector also examines the UV-fluorescent properties of the banknote in question using a secondary photodiode, the UV-pass filter is required in front of the UV-led.

A white reference tile 3 is located opposite the source 1, banknotes being transported across the reference tile in use by a transport system (not shown). UV radiation reflected from the tile 3 or a banknote together with fluorescent light emitted by the banknote in response to UV radiation is detected by signal sensors such as photodiodes 4,5. Each photodiode 4,5 is associated with a respective filter 6,7, the filter 6 passing visible light resulting from fluorescence and the filter 7 passing UV, reflected radiation.

Output signals from the sensors 4,5 representing the intensity of the incoming radiation are sampled and digitized by a sensor signal processing unit 8.

In order to compensate for variations in the output intensity of the source 1 in the case of a UV lamp, a reference sensor 9 is also provided to monitor and stabilize the output of the UV lamp 1 via a feedback system. The reference sensor 9 is not required in the case of UV LEDs which have much greater stability.

The source 1 may either provide a constant illumination level or for detectors that are required to work in "noisy" conditions, stray light etc., then the illumination source may be modulated. The control of the source 1 is provided via an illumination control unit 10.

In use, when no note is present, the source 1 illuminates the reference tile 3. The reference tile 3 is white and diffusely reflects the UV illumination from the source, the reflected radiation being detected by the sensor 5. The level of signal from the sensor 5 is used as a reference, and all measurements are compared to this level. From this level, a note detection threshold level is set so that the detector may self-trigger when a note passes under the detector head. The detection threshold from a note edge is set as a fixed amount below the level obtained from the tile 3. Alternatively, the detector could trigger off another detector such as a note counting detector.

In addition, a UV reflectance threshold or range is set. This may be the same for all notes or could vary with denomination or issue. In the latter case, the processor 11 will prestore a set of thresholds (typically offsets to be applied to the reference level) for each denomination/issue. The denomination/issue will be determined from the size or visible appearance of the banknote and this will be used to select the appropriate UV reflectance threshold.

Size could be determined using data from the sensor 5 coupled with speed information from the encoder or from a separate size detector. Visible appearance can be determined using conventional pattern recognition. In the case of two detectors (authenticity and denomination), these can be provided in either order with respect to the direction of movement of the note.

The second signal sensor 4 which measures the fluorescence level is not used when no note is present.

The monitoring of reflected and fluorescent radiation is carried out by a data processing and detector control processor 11 connected to the sensor signal processing unit 8 and illumination control unit 10. The processor 11 receives encoded pulses from the transport system so that is it can monitor the speed of movement of the banknote and hence control sampling of the sensor output signals.

In response to the reflected UV from the reference tile 3, the processor 11 controls the gain which is applied to output signals from the sensor 5. Since it is assumed that the sensor 4 will have a similar response, a similar gain is applied to the output signals from the sensor 4. This background calibration is designed to account for variations in brightness of the LEDs and dirt build up on the surface of the detector glass.

As explained above, in some cases, the level of reflected UV alone, as detected by the sensor 5, may be sufficient to determine authenticity by determining whether or not it falls within a predetermined range. This process could be further refined by looking at reflected UV from certain predetermined regions of a banknote rather than the banknote as a whole. In more sophisticated cases, both UV reflectance and fluorescence can be used to determine authenticity, from the same or from opposite sides.

The advantage of using a UV LED in place of a fluorescent lamp will now be explained with reference to FIG. 2. A typical UV lamp is a mercury vapour discharge fluorescent lamp which contains a phosphor which absorbs the 254 nm emissions from the discharge and re-emits in the UV close to 365 nm; there are also some visible emissions. In some cases, the lamp is constructed from Woods glass, which transmits most of the UV output of the lamp and absorbs most of the visible output (the “Blacklight Blue” type). In other cases, the lamp is constructed from clear glass and a separate UV pass/visible absorb filter is used. A typical output spectrum is shown at 20 in FIG. 2, although the details will vary with the implementation.

For comparison, the output spectrum from a UV LED is shown at 21.

Figure 2:
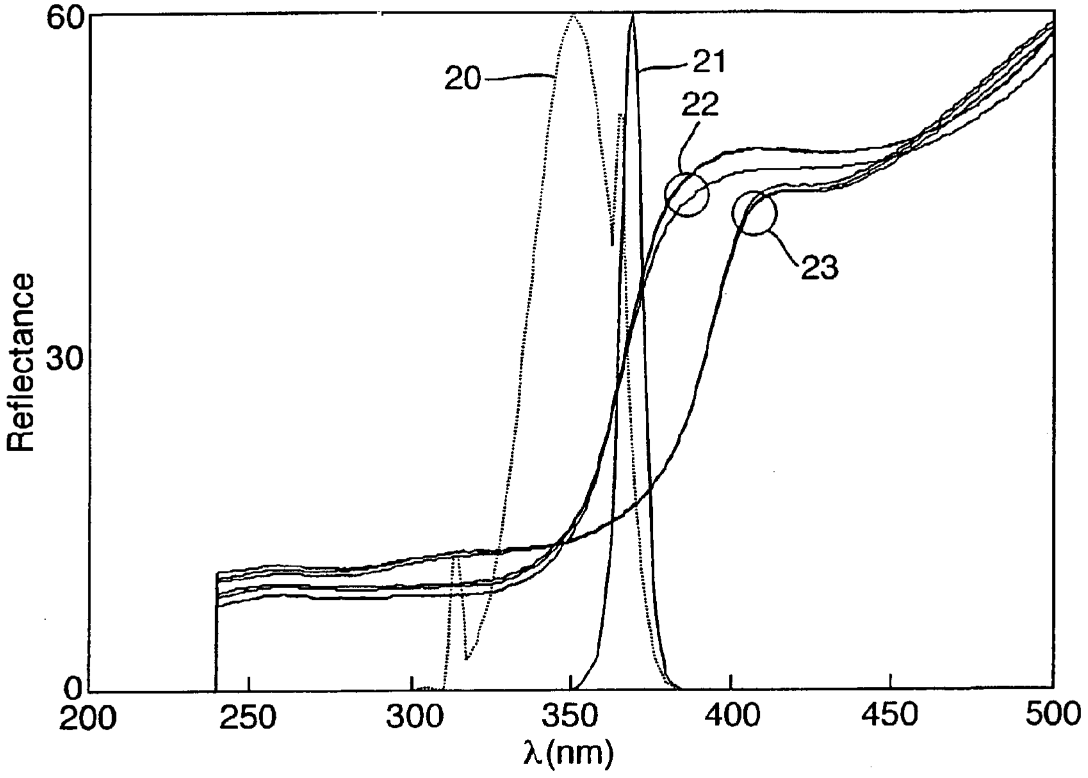
FIG. 2 is a diagram illustrating reflectance characteristics of banknotes and output characteristics of fluorescent sources.

FIG. 2 also shows the reflectivities of three genuine 22 and three counterfeit 23 banknotes, measured over a range of wavelengths from about 240 nm to 500 nm. It can be seen that there is a significant difference between the genuine and counterfeit notes. The reflectivity of the genuine notes is greater than that of the counterfeits over the range about 350 nm to about 440 nm; the maximum difference is at about 375 nm, which falls in the UV region. Genuine and counterfeit notes may therefore be distinguished by measuring the reflectivities in this region. Greatest discrimination is achieved by measuring at wavelengths close to 375 nm.

It can be seen, therefore, that the vast majority, if not all, of the output 21 of the LED falls in the region where the reflectivity of the genuine notes exceeds that of the counterfeit notes, so giving a good discrimination between genuine and counterfeit.

Figure 3:
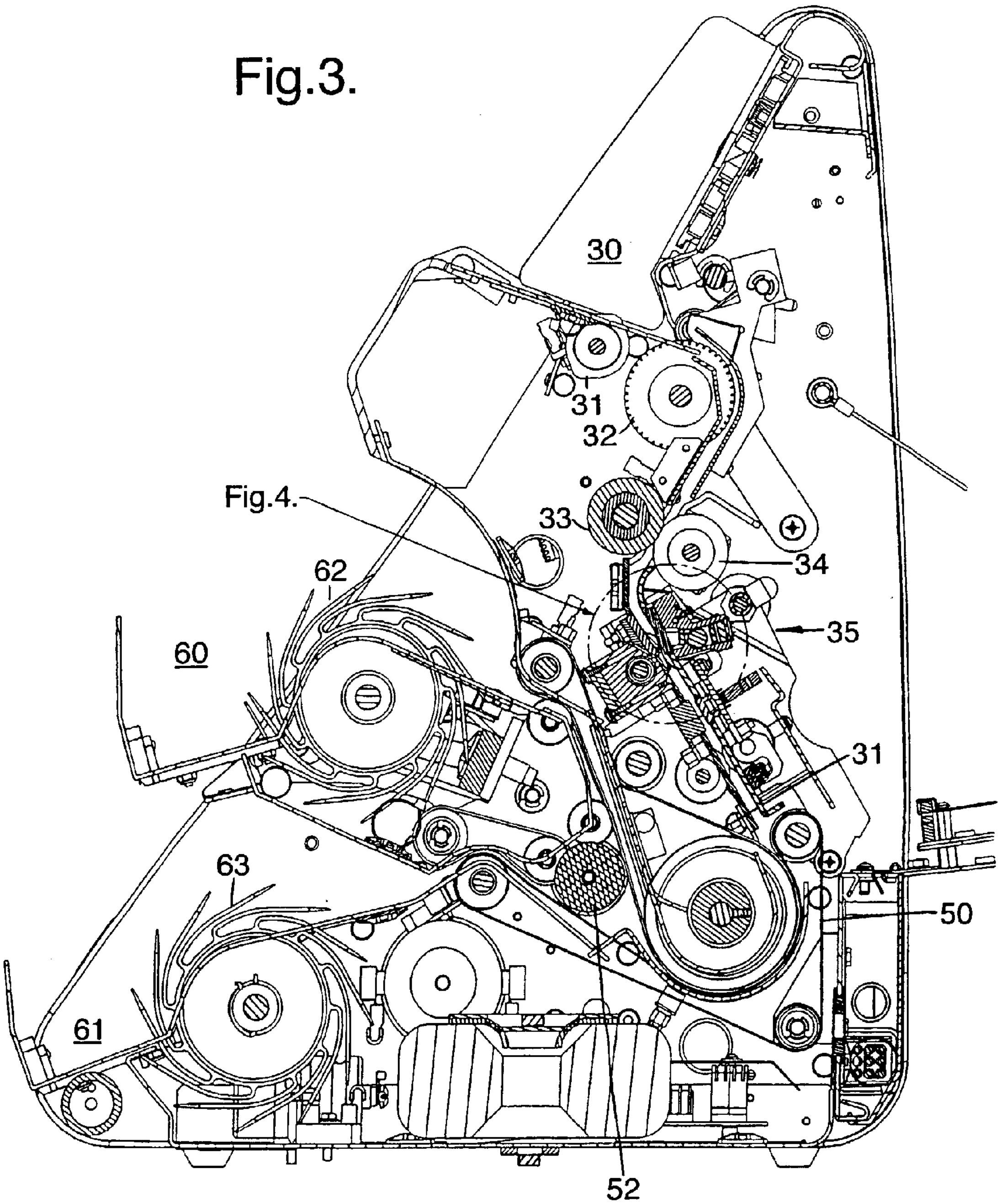
FIG. 3 is a cross-section through a first example of banknote note handling apparatus.
Figure 4B:
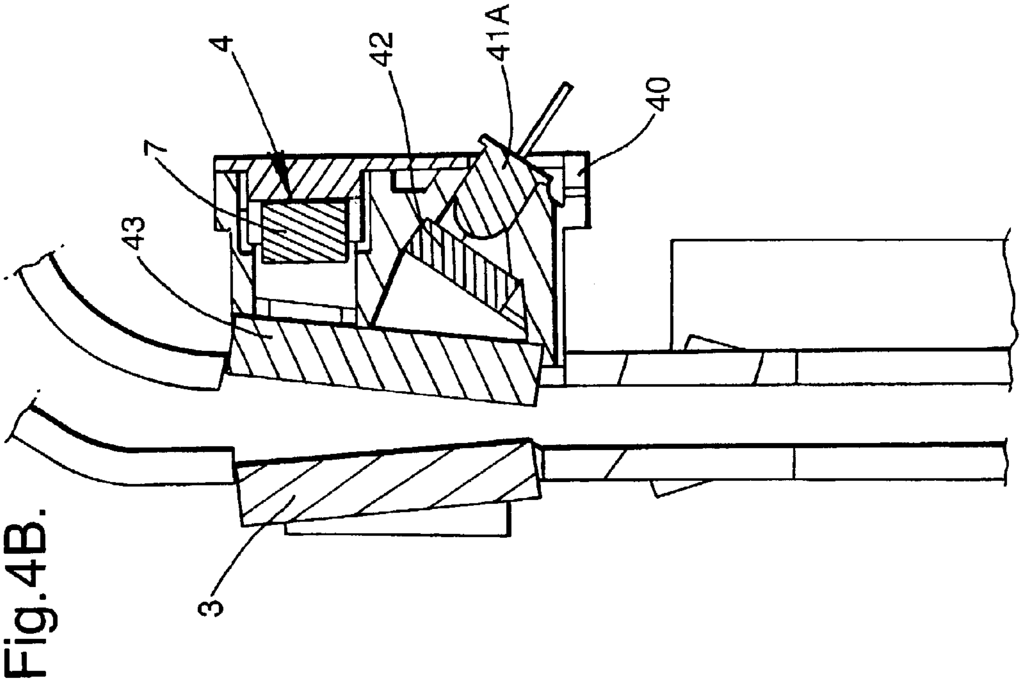
FIG. 4B is a view similar to FIG. 4A but of a modified arrangement; and, FIG. 5 is a schematic cross-section through a second example of banknote handling apparatus.
Figure 4A:
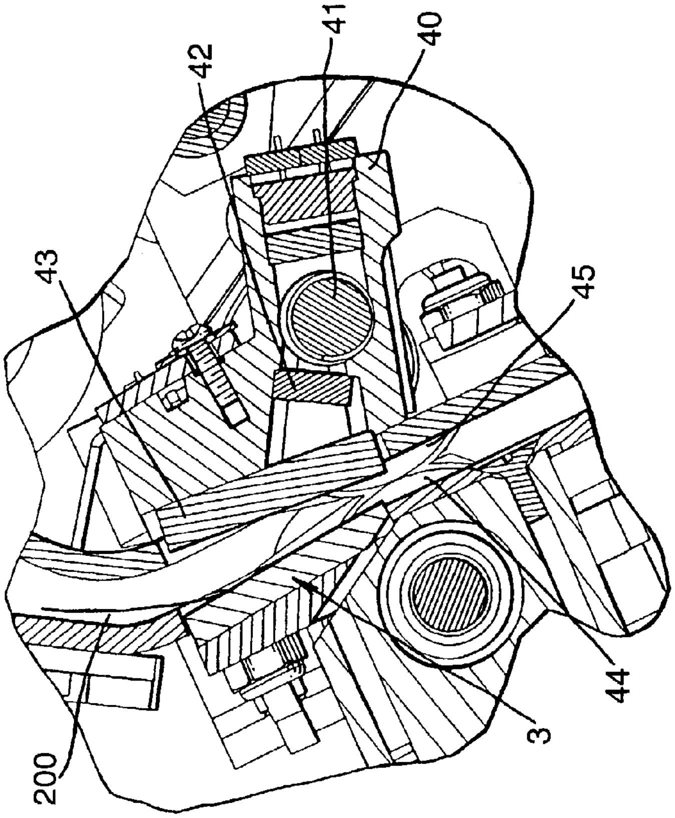
FIG. 4A is an enlarged view of detail A in FIG. 3.

FIGS. 3 and 4A illustrate a first example of a banknote handling apparatus incorporating a detector of the type shown in FIG. 1. This apparatus is substantially the same as the De La Rue 2800 machine and so will not be described in detail. The machine comprises a banknote input hopper 30 from which banknotes are fed one by one by rotation of a nudger roller 31 and a separation feed roller 32. The banknotes are guided through a nip defined between rollers 33,34 into an inspection station 35. The inspection station 35 includes authentication apparatus shown in more detail in FIG. 4A and a denomination detector 80.

The authentication apparatus (FIG. 4A) includes a detector head assembly in which is mounted a TV lamp 41. UV radiation from the UV lamp 41 passes through a UV pass filter type HOYA U360 42 and a glass plate 43 defining part of the guide assembly, the plate 43 being angled to guide incoming banknotes 200 into a nip defined between a pair of rollers 44,45.

Mounted opposite the plate 43 is a reference tile 3 which, as can be seen in FIG. 4A, is angled to guide incoming banknotes 200 towards the nip between the rollers 44,45. Thus, the leading end of an incoming banknote 200 will engage a leading end of the tile 3 at an acute angle and be pushed along the surface of the tile 3 thereby effecting a cleaning action before it is received in the nip between the rollers 44,45.

FIG. 4B illustrates an alternative arrangement to that shown in FIG. 4A where those elements having the same construction as FIG. 4A have been given the same reference numerals. In this case, the UV lamp 41 has been replaced by a UV LED 41A. This emits some light in a visible spectrum as well as in the UV and this visible light is blocked by the filter 42 which is a Hoya U360 filter. A pair of sensors are provided as shown in FIG. 1, the sensor 4 and associated filter 7 being visible in FIG. 4B.

In either configuration, the UV source is ideally arranged so that the light it emits does not reflect specularly from the note 200 or tile 3 into the receiver, but rather reflects diffusely in all directions. Specular reflection is much more variable and looks at the surface properties rather than the bulk of the target.

Initially a reference level reading is obtained from the tile 3 as explained above. The transport is then started and notes fed passed the authentication apparatus where reflected and fluorescent radiation is detected from all or predetermined portions of the notes. Having passed through the authentication apparatus, the denomination and/or issue of the banknote is determined using a pattern recognition technique as well known in the art. The received denomination/issue information is used to select a UV reflectance threshold as explained above, the processor 11 then checking the authenticity of the notes accordingly. In addition, its fluorescent characteristics are checked. If both the reflectance and fluorescent characteristics are acceptable, the note is considered authentic.

The note is then received between a pair of feed belts 50,51 which guide the note to a diverting roller 52. The direction of rotation of the roller 52 is controlled by the processor unit 11 so that banknotes whose denomination and authenticity have been confirmed will be fed towards an output hopper 61 (clockwise rotation) while other banknotes are fed towards an output hopper 60 (anti-clockwise rotation). Each hopper 60,61 has its own stacker wheel 62,63 respectively.

For a note to be determined as excessively fluorescent, it needs to be compared with the fluorescence value of the note previously passed through the authentication apparatus. The first note through is assumed to be UV-dull (i.e. low fluorescence), and (providing no other detector rejects it) it is placed in the bottom accept hopper 61. If the second note is UV-brighter (i.e. more intense visible fluorescence) than the first note, the second note is rejected and placed in the reject hopper 60. If the second note is the same brightness as the first note, it is placed in the bottom accept hopper 61. However, if the second note is UV-duller than the first note, then this indicates that the assumption that the first note was dull is incorrect, and therefore the first note must be a reject. Because the first note has been incorrectly placed in the bottom accept holder 61, the machine STOPS with an error code on the display, indicating the notes in both hoppers 60,61 are rejects. If the first two notes have successfully been placed in the bottom accept hopper 61, this indicates the original assumptions about the notes being UV-dull are correct. The average of the two readings is then used as the basis for the threshold to be used for further UV fluorescence measurements, with a running average being generated for subsequent notes. Any UV-flourescent bright notes detected after the first two notes passed through the machine are placed in the top reject hopper 60, which does not require the machine to halt prematurely.

Figure 5:
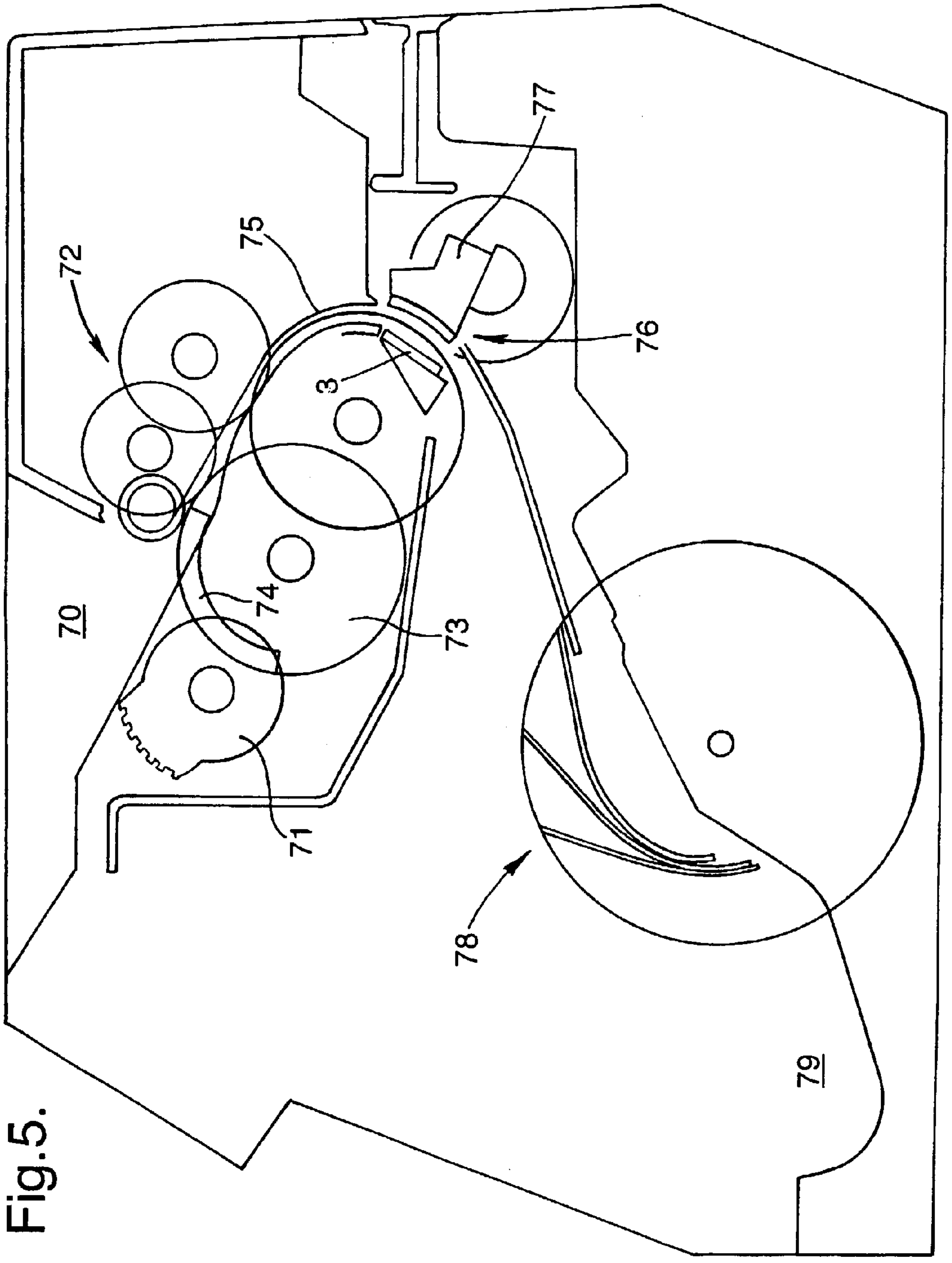

FIG. 5 illustrates a second example of a banknote handling machine based on the De La Rue 2700 machine. The primary difference from the FIG. 3 example is that this is a single output hopper machine. The machine comprises an input hopper 70 from which banknotes are fed upon rotation of a nudger roller 71 into a separation system 72 having a feed roller 73 with a high friction insert 74. The banknotes are then fed around a guide path 75 to an inspection station 76. The inspection station 76 has the same construction as the inspection station 35 in FIG. 3 with a detector head 77 and a reference tile 3, and a pattern recognition detector. Again, the reference tile 3 is placed at an angle such that incoming banknotes will rub along its surface so as to clean it.

In this case, if the banknote is determined not to be authentic and/or its denomination cannot be determined then the transport system is stopped and a suitable error message displayed. Otherwise, accepted banknotes will be stacked using a stacker wheel 78 into an output hopper 79.

The invention claimed is:

1. An authenticating apparatus for documents of value comprising a transport system for transporting the document; an inspection device past which the documents are transported by the transport system, the inspection device including a UV source and a UV detector arranged to irradiate a document and to detect reflected UV respectively; and a processor responsive to the reflected UV to determine the authenticity of the document, the inspection device including a reference surface over which the documents are transported in use, the reference surface being exposed to UV radiation from the source in the absence of a document so as to generate a reference level signal, and being oriented such that the documents are delivered at an acute angle to the surface whereby passage of a document across the surface effects a cleaning action on the surface.

2. Apparatus according to claim 1, wherein the reference surface is white.

3. Apparatus according to claim 1, wherein the UV source comprises a UV LED.

4. Apparatus according to claim 1, the apparatus further comprising:

a LED which emits UV radiation in a wavelength range at which non-genuine documents have a different reflectivity than genuine documents;

the transport system transports documents past the LED so that they are irradiated with UV radiation; and a second detector for detecting fluorescent light emitted by the document in response to UV irradiation, the processor being responsive to output signals from both detectors to determine the authenticity of a document and the processor compares the intensity of the reflected UV radiation with a threshold to determine the authenticity of the documents.

5. Apparatus according to claim 1, adapted to handle banknotes.

* * * * *